Patented July 10, 1951

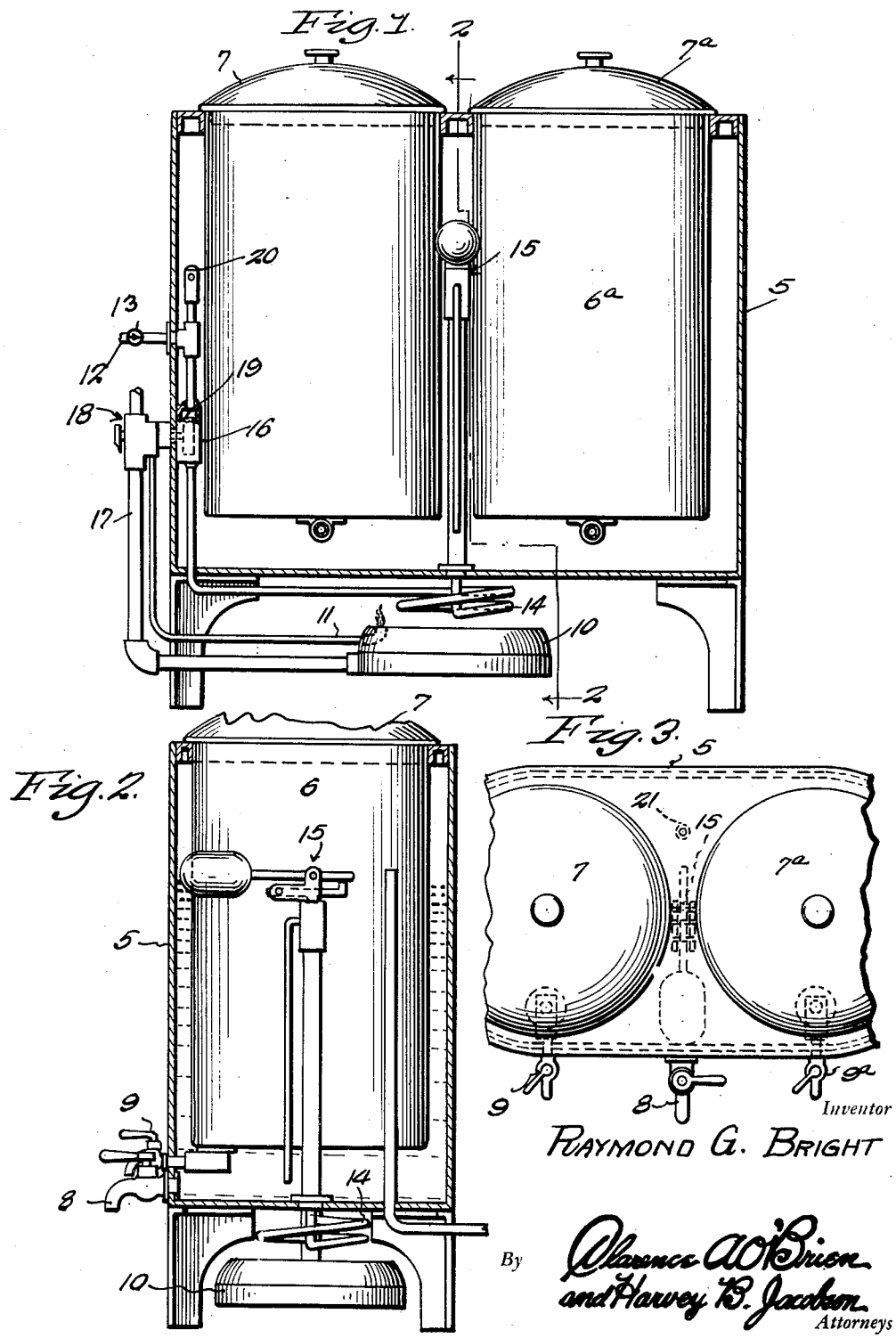

2,559,931

UNITED STATES PATENT OFFICE 2,559,931

AUTOMATICALLY CONTROLLED WATER HEATER FOR COFFEE URNS

Raymond G. Bright, El Paso, Tex.

Application May 7, 1946, Serial No. 667,895

1 Claim. (Cl. 126—374)

This invention relates to improvements in coffee urns of the percolator type, wherein a percolating receptacle is arranged within an outer shell forming a water chamber, and means is provided for heating the water supplied to said water chamber so that hot water may be drawn from the latter when desired for use in making liquid coffee in the percolating receptacle.

The present invention particularly relates to the provision, in a coffee urn of the above kind, of means to supply additional heated water to the water chamber when hot water is drawn therefrom.

More particularly, the present invention contemplates provision of a thermostatic valve to regulate the flow of gas to a burner which heats the water supplied to the water chamber and which maintains the water in such chamber in a heated condition, in accordance with the temperature of the water in the water supply pipe adjacent the urn, and a float valve for controlling the flow of water to the water chamber in accordance with the level of the water within the latter.

More specific objects and features of the invention will become apparent from the following description when considered in connection with the accompanying drawing, in which:

Figure 1 is a view of a coffee urn embodying the present invention, partly in front elevation and partly in central vertical section;

Figure 2 is a vertical transverse section taken substantially on line 2—2 of Figure 1;

Figure 3 is a fragmentary top plan view of the urn shown in Figure 1.

Referring in detail to the drawing, the urn illustrated comprises an outer shell 5 which forms a hot water chamber, and in which is mounted percolating receptacles 6 and 6a having removable lids 7 and 7a. The shell 5 and receptacles 6 and 6a are provided at the bottom with the usual discharge faucets 8 and 9 and 9a, respectively. As is well known in the art, hot water is drawn from the shell 5 through the faucet 8 for use in making liquid coffee in the percolating receptacles 6 and 6a. Also, heating means is provided for maintaining the water in the shell 5 in a heated condition, such means including a gas burner 10 having a pilot light 11 and being positioned beneath the shell 5. Thus far described, the construction is conventional and well known in the art.

The shell 5 is supplied with water under pressure through a supply pipe 12 having a check valve 13 therein and provided between the check valve 13 and its outlet end with a heating coil 14 positioned beneath the shell 5 and directly above the burner 10. The outlet end portion of pipe 12 extends from the coil 14 into the shell 5 at a point between the receptacles 6 and 6a, and is equipped at its outlet end within the shell 5 with a conventional float valve 15 by means of which the water is maintained at a substantially constant level within the shell 5. In other words, when water is withdrawn from the shell 5 through the faucet 8 and the level of the water in the shell 5 is thereby lowered, the float valve 15 automatically opens so as to admit additional water to the shell 5. Also, when the water reaches a predetermined level in the shell 5, the float valve 15 automatically closes so as to cut off the supply of water to the shell. As shown in Figure 1, the portion of the pipe 12 near but ahead of the coil 14 is provided with an enlargement 16, and the burner 10 is provided with a fuel supply pipe 17 equipped with a thermostatic valve 18 which regulates the flow of gas or fuel to the burner 10 in accordance with the temperature of the water in the pipe 12. The thermo-sensitive actuating element 19 of valve 18 is located in the enlargement 16, and the latter is provided in a portion of pipe 12 which extends into the shell 5. This portion of pipe 12 is also preferably provided with a safety pressure relief valve 20 directly ahead of the enlargement 16 for an obvious and usual purpose.

As previously stated, the flow of water through the coil 14 and into the shell 5 is controlled by the amount of water in said shell, so that when the water in the shell 5 is withdrawn and the level of the water in said shell is lowered, additional water will be discharged into said shell for maintaining the supply therein.

In use, water is withdrawn from the shell 5 through the faucet 8 for use in making coffee in the percolating receptacles 6 and 6a, the coffee being withdrawn as needed from said receptacles through the faucets 9 and 9a. When water is withdrawn through faucet 8, float valve 15 opens so as to permit water to flow to and through coil 14 into the shell 5 until the water again reaches a predetermined level within the latter. As the water flows to and through coil 14, the cold water flowing past the thermo-sensitive element 19 of thermostatic valve 18 causes the latter to open and increase the flow of fuel to the burner 10. This insures instantaneous heating of the water flowing through the coil 14 into the shell 5. When the flow of water through coil 14 is shut off by float valve 15, and the water in the pipe 12 ahead of the coil 14 attains a predetermined temperature, the thermostatic valve 18 reduces the flow of fuel to burner 10 so that overheating of water in the coil 14 will be prevented, although sufficient heat will be supplied by burner 10 to maintain the water in the shell 5 in a properly or desired heated condition suitable for the coffee making operation. In case the float valve 15 should fail to operate and open properly, excess steam will be released from the pipe 12 through the safety valve 20.

The shell 5 is also provided, preferably at a point between the receptacles 6 and 6a with an overflow pipe 21 that may be connected with a suitable drain or other point of disposal. This overflow pipe prevents water from filling and overflowing the shell 5 in case the float valve 15 should fail to properly operate and thereby remain in open position after the water has attained a predetermined level within the shell. The open upper end of pipe 21 is of course located slightly above this predetermined level but well below the top of shell 5.

It will be apparent that by means of the present invention, economy of fuel for the burner 10 is effected, the burner being only turned high at intermittent short intervals for heating the water flowing through the coil 14 and being turned down low most of the time simply to maintain the water in heated condition after it has been previously heated in the coil 14 and supplied to the shell 5. The apparatus is entirely automatic in operation in response to withdrawal of hot water from shell 5 through faucet 8.

From the foregoing description, it is believed that the construction, operation and advantages of the present invention will be readily understood and appreciated by those skilled in the art. The invention is applicable to urns of different specific constructions, such as one involving one or more than two percolating receptacles. Minor changes in details of construction are also contemplated, such as fall within the scope of the invention as claimed.

What I claim is:

In a coffee urn, a hot water chamber, a gas burner beneath the hot water chamber for maintaining the water therein at a predetermined temperature, a water supply pipe for the hot water chamber having a heating coil portion disposed beneath the hot water chamber directly over the burner and a portion ahead of the heating coil submerged in the water within the hot water chamber, a float valve in the water chamber controlling the flow of water from the heating coil into the hot water chamber so as to maintain the water therein substantially at a constant level, and a thermostatically operated valve for controlling the flow of fuel to the burner, said valve having a thermo-sensitive actuating element subjected to the temperature of the water in the submerged portion of the water supply pipe so as to automatically increase the supply of fuel to the burner when hot water is withdrawn from the hot water chamber and the float valve opens to permit supply of water from the heating cool to the hot water chamber and to automatically decrease the supply of fuel to the burner after the float valve cuts off supply of water to the hot water chamber from the heating coil, said submerged portion of the water supply pipe being provided with an enlargement, said thermo-sensitive actuating element being arranged in said enlargement.

RAYMOND G. BRIGHT.

REFERENCES CITED

The following references are of record in the file of this patent:

UNITED STATES PATENTS

| Number | Name | Date |
| --- | --- | --- |
| 814,960 | Heibel | Mar. 13, 1906 |
| 1,397,620 | Clark | Nov. 22, 1921 |
| 1,508,809 | White | Sept. 16, 1924 |
| 1,882,247 | Levings | Oct. 11, 1932 |
| 2,206,424 | Oyen | July 2, 1940 |
| 2,387,871 | Baumann | Oct. 30, 1945 |